United States Patent Office 3,400,775
Patented Sept. 10, 1968

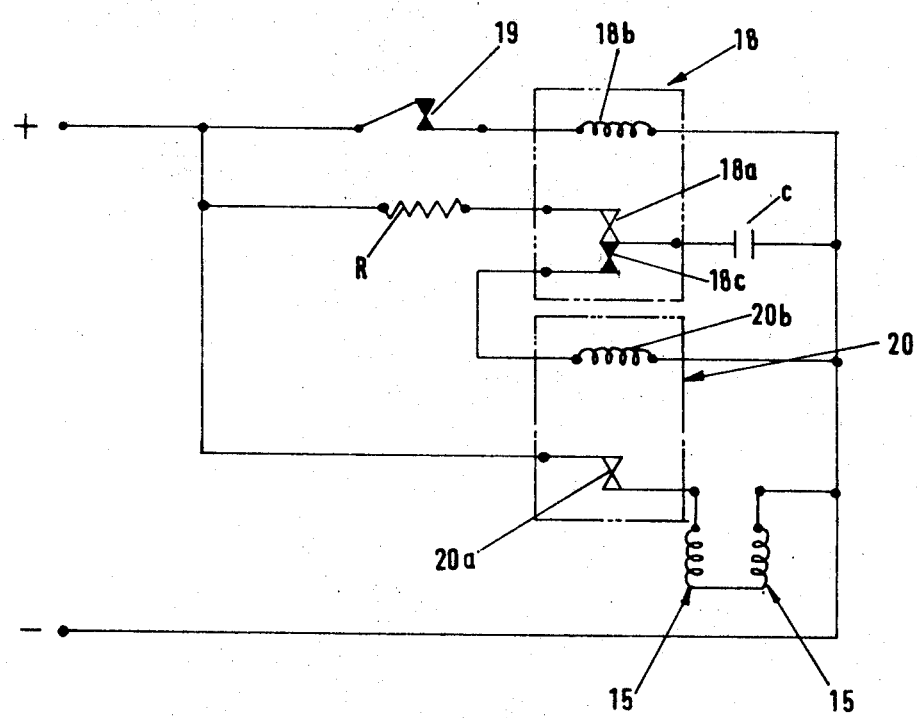

3,400,775
AUTOMATIC WEIGHER WITH RAPPING MEANS TO AID DISCHARGE OF MATERIALS
Benjamin Mackenzie, Harrow, and Arthur Walter Forman, Ruislip, England, assignors to Driver Southall Limited, South Ruislip, England, a British company
Filed Jan. 14, 1966, Ser. No. 520,598
Claims priority, application Great Britain, Jan. 22, 1965, 2,840/65
7 Claims. (Cl. 177—113)

ABSTRACT OF THE DISCLOSURE

A weigh pan in a weighing apparatus has a pivoted discharge door which is automatically rapped in open position for more effective discharge of even sticky materials. The discharge door is first opened by the automatic release of hook-like catches when a predetermined weight is reached and then electromagnetic means attract the door to a still further open position and into rapping or impact engagement with armatures of the electromagnetic means.

---

This invention relates to weighing apparatus particularly, but not exclusively, of an automatic nature in which material to be weighed out in batches is continuously fed into a weigh pan until weighing balance occurs, whereupon feed of the material is halted and the batch of material in the pan is discharged therefrom.

It is an object of the invention to provide means for assisting the discharge of material from a weigh pan, whereby the invention is particularly suited to weighing apparatus for weighing materials of a sticky nature.

In accordance with the invention weighing apparatus comprises a weigh pan incorporating a discharge door moveable between pan closed and pan open positions, and automatic means for rapping the door in its open position.

Preferably in the weighing apparatus according to the invention the aforesaid rapping means also serves to retain the discharge door in the open position for a predetermined period against the action of a door closing device.

A typical example of the practical realisation of the invention is illustrated in the accompanying drawings wherein:

FIGURE 3 is a wiring diagram showing a circuit employed for the control of the parts of FIGURES 1 and 2.

Figure 1:
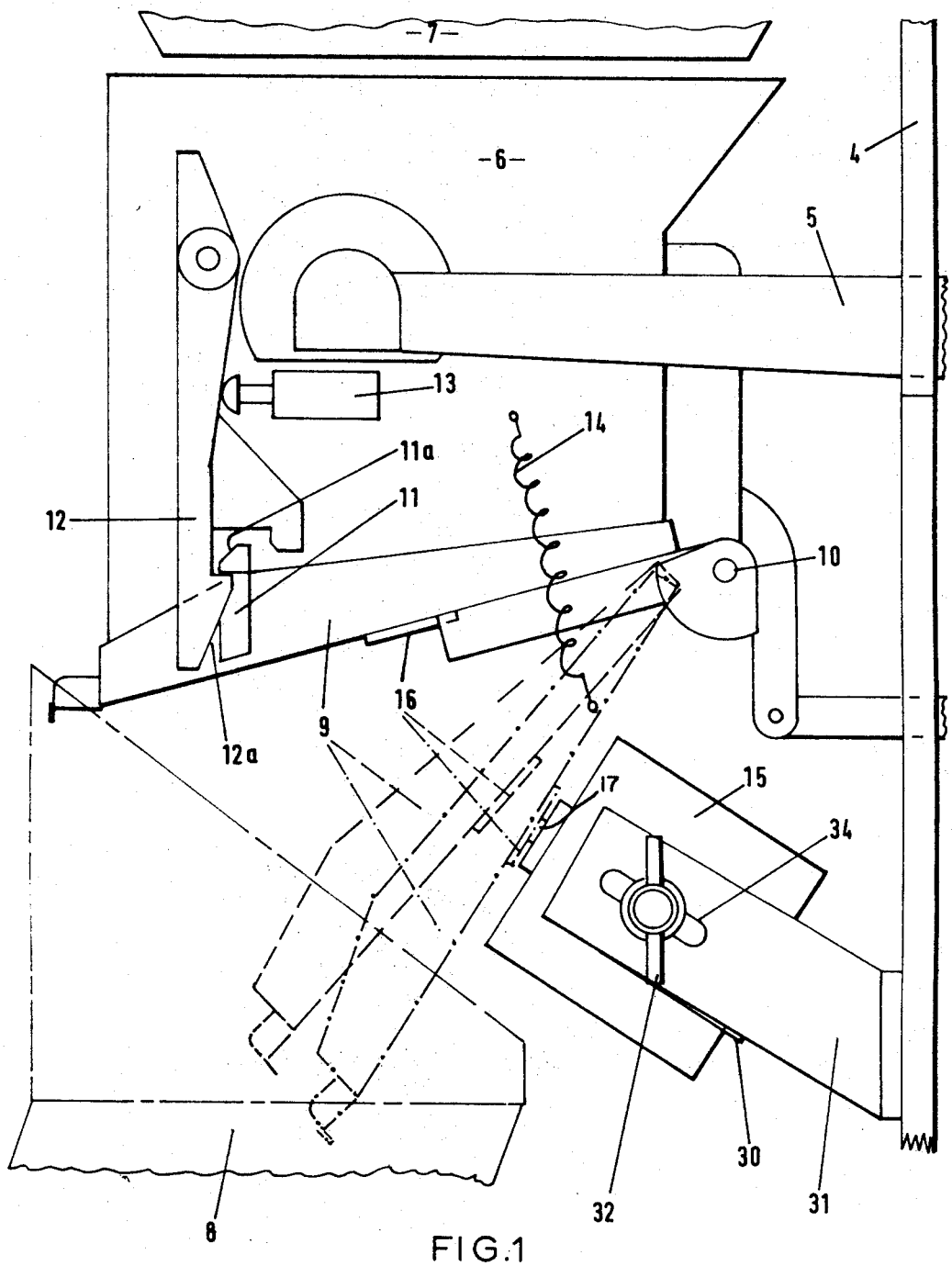
FIGURE 1 is a schematic side elevation of a sufficient part of a weighing apparatus for an understanding of the invention.
Figure 2:
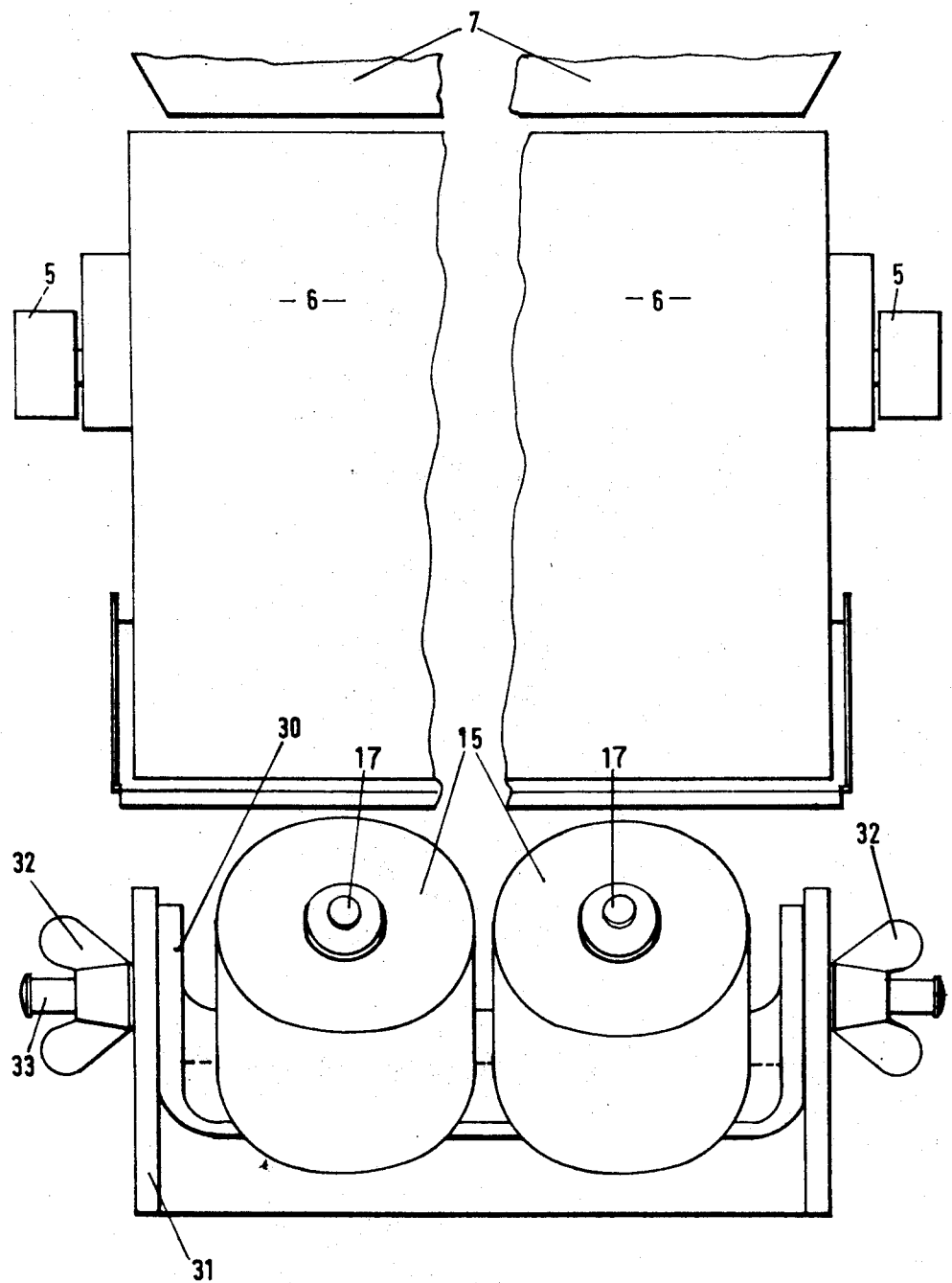
FIGURE 2 is a view in side elevation looking from left to right in FIGURE 1 and showing details of various parts of FIGURE 1.

Referring to FIGURES 1 and 2, a framework 4 is provided in which is pivoted a weighbeam 5 provided at one end with a weigh pan 6 and at the other end with counterbalancing means (not shown). The weigh pan is disposed beneath a charge chute 7 and above a discharge chute 8, whereby material can be fed through the charge chute into the weigh pan until weighing balance occurs, whereupon the feed of the material is halted and the material in the pan is discharged from the pan into and through the discharge chute to its destination.

The weigh pan body 6 has an open top and bottom with the latter closeable by an approximately rectangular discharge door 9. The discharge door 9 is pivoted to the weigh pan body 6 at 10 along the bottom edge of one side of the body, and is provided with two upstanding hook-like catches 11 on opposite sides of the door remote from the pivot and engageable with complementary hook-like catches 12 depending from sides of the pan body. The latter catches 12 are pivotally mounted and formed with camming surfaces 12a co-operating with camming surfaces 11a on the upstanding catches 11, whereby in closing of the door 9 the depending catches 12 are caused to pivot until the camming surfaces 11a, 12a, pass one another, whereupon return pivoting of the depending catches 12 under action of spring means (not shown) occurs to latch the door in a closed position (as shown in full lines in FIGURE 1). The depending catches 12 are provided with solenoid operated or mechanical means 13 for effecting their pivotal movement so as to allow opening of the discharge door 9 under the action of the weight of the material held in the pan.

The weigh pan body 6 is also connected to the discharge door 9 through a pair of helical springs 14 such that once the door is relieved of the weight of the material in the weigh pan, the tension in the springs created by the opening of the door, serves to return the door towards the pan closed position with a momentum sufficient to effect re-engagement of the catches 11, 12.

The aforesaid construction follows conventional practice and accordingly does not require more detailed description.

According to this embodiment of the invention the framework is provided with two magnetic coils 15 side-by-side and disposed to be close to but with their projecting armatures essentially spaced from a ferro-magnetic central portion 16 of the discharge door when the door is in open position (shown in broken lines in FIGURE 1) under the control of the load and helical springs alone. The arrangement is such that energization of the coils 15 when the door is in the open position attracts the door portion 16 towards and into rapping or impact engagement with the armatures 17 (as shown in "dot and dash" lines in FIGURE 1). By this means material loosely retained in the pan body 6 and on the discharge door 9 is given a shock which has been found to be effective in producing more complete discharge.

To facilitate adjustment of the correct positioning of the coils 15, the latter are conveniently mounted on a common bracket 30 mounted for both linear and pivotal movement relative to a bracket 31 bolted to the framework 4. Wing nuts 32 engaged with screwed lugs 33 projecting from the bracket 30 through elongated holes 34 in the bracket 31 permit locking of these movements.

Referring now to FIGURE 3, there is shown a circuit for controlling the energization of the coils 15. More specifically, whilst the material is being fed into the pan 9 a condenser C is charged via a resistor R and the normally open contacts 18a of a relay 18 whose coil 186 is energized through a pair of contacts 19 which are closed with the pan door. As soon as the weighing has ceased, and the pan is signalled to discharge in known manner, the action of the door opening causes the contacts 19 to open which de-energizes the relays 18. The charge on the condenser C is then discharged through the change-over contacts 18c of relay 18 and the coil 20b of relay 20 which is thereby energized for a brief period, say ½ second. Contacts 20a on relay 20 close for this same period and the magnet coils 15 are energized by the direct current supply for the same time.

In addition to affording the advantages rapping of the weigh pan door, the invention offers the added advantages that the discharge door is held open by the magnetic coils 15 for a longer period than is attained by the springs 14 alone, so that all particles of the material in the weigh pan have more time to escape before the door is closed thereby providing a more complete discharge of the weigh pan contents, and with accompanying smaller risk of the pan door being prevented from properly closing due to the presence of particles falling on or between the door and pan body as the former approaches the closed position.

We claim:

1. Weighing apparatus comprising a container carried by a weigh beam and adapted to receive the material to be weighed, a discharge door on the lower part of said container movable between a closed position and a material discharge position where it is in the path of material discharging from the container, and electromagnetic means automatically operable when said door is in open position for attracting and moving said door into rapping contact with an abutment.

2. Weighing apparatus as defined in claim 1, wherein means is provided for closing said door after the container contents are discharged, and said electromagnetic means being effective to hold said door against said abutment for a predetermined time in opposition to said closing means.

3. Weighing apparatus as defined in claim 1, wherein said door is pivoted and return spring means are provided for reclosing the door after discharge of the material from said container and upon release of the door by said electromagnetic means.

4. Weighing apparatus as defined in claim 1, wherein said electromagnetic means comprises a coil having an armature that serves as said abutment.

5. Weighing apparatus as defined in claim 1, including means for adjustably mounting said electromagnetic means for optimum association with said door.

6. Weighing apparatus as defined in claim 1, wherein said door opens after a predetermined weight of material is in said container and said electromagnetic means is disposed in a circuit that is energized by opening of said door and remains energized for a predetermined period to permit complete discharge of the material from the container.

7. Weighing apparatus comprising a weigh pan, a discharge door movable between pan closed and pan open positions, and automatic means for rapping said door in its open position comprising at least one electromagnetic coil operative to displace the door from its open position into sharp contact with an abutment and an electric circuit for energizing the coil so as to retain the door in contact with the abutment for a predetermined time, said circuit comprising a resistance/capacity discharge circuit.

References Cited

UNITED STATES PATENTS

| | | | |
|---|---|---|---|
| 1,376,138 | 4/1921 | Curran et al. | 177—76 |
| 2,676,733 | 4/1954 | Lober | 177—110 XR |
| 2,760,232 | 8/1956 | Rougement et al. | 177—108 XR |
| 3,071,202 | 1/1963 | Lytton et al. | 177—108 XR |
| 3,159,225 | 12/1964 | Zimmercan | 117—110 XR |

FOREIGN PATENTS 123,887  1/1949  Sweden.

ROBERT S. WARD, JR., *Primary Examiner.*